United States Patent

[11] 3,560,631

[72] Inventors Lee A. Rhoades;
 Manley T. Mallard, Culpeper, Va.
[21] Appl. No. 822,334
[22] Filed Jan. 21, 1969
 Division of Ser. No. 621,337,
 Mar. 7, 1967, Patent No. 3,482,034
[45] Patented Feb. 2, 1971
[73] Assignee The Rochester Corporation
 Culpeper, Va.
 a corporation of Virginia

[54] MULTICONDUCTOR ARMORED TOWING ROPE
 7 Claims, 3 Drawing Figs.
[52] U.S. Cl. .................................................. 174/113,
 174/115, 174/103, 174/120

[51] Int. Cl. ........................................................ H01b 7/18
[50] Field of Search ............................................ 174/113,
 115, 128, 102, 103, 116, 120

[56] References Cited
 UNITED STATES PATENTS
 3,467,767 8/1969 Toto ............................ 174/113

Primary Examiner—E. A. Goldberg
Attorney—Christen and Sabol

ABSTRACT: A fishing trawl net includes electrical shocking cables and other electrical instrumentation. The net is towed by a high tensile strength cable which includes an electrically conductive core.

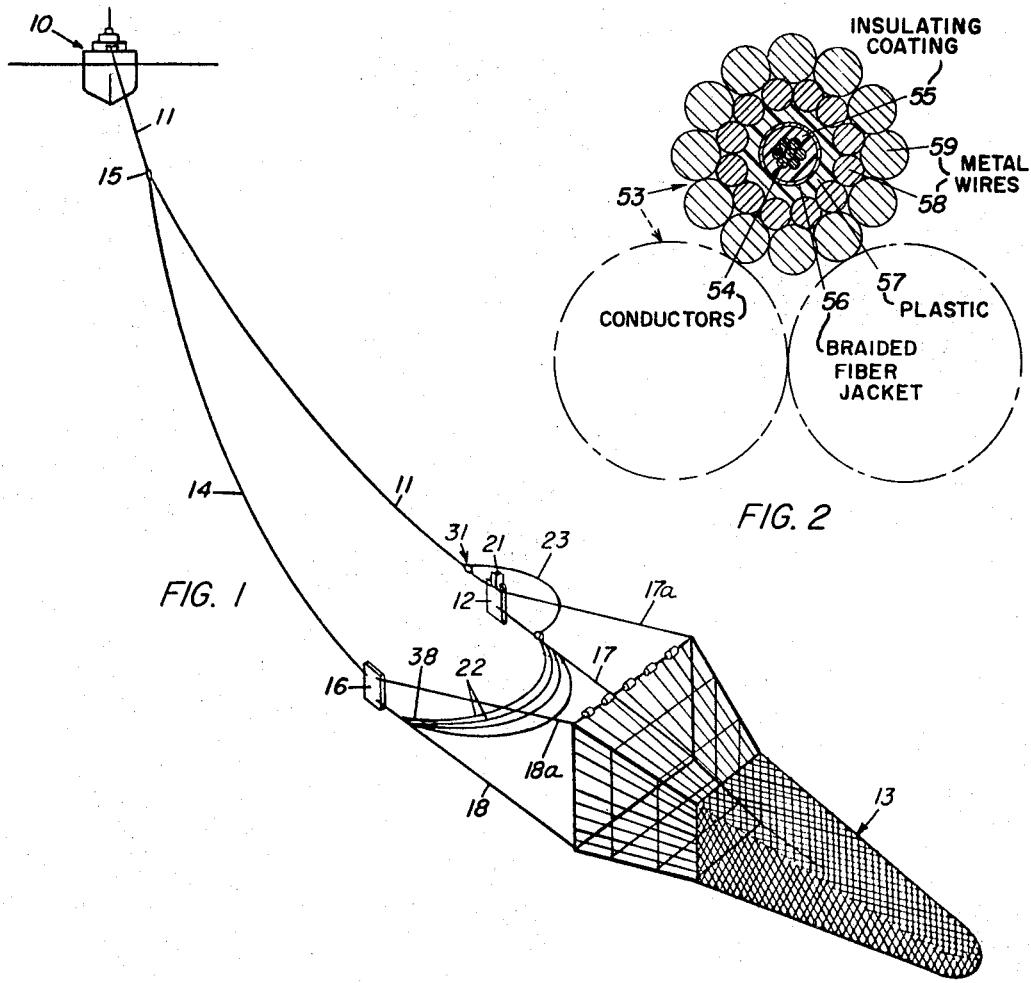
FIG. 1
FIG. 2
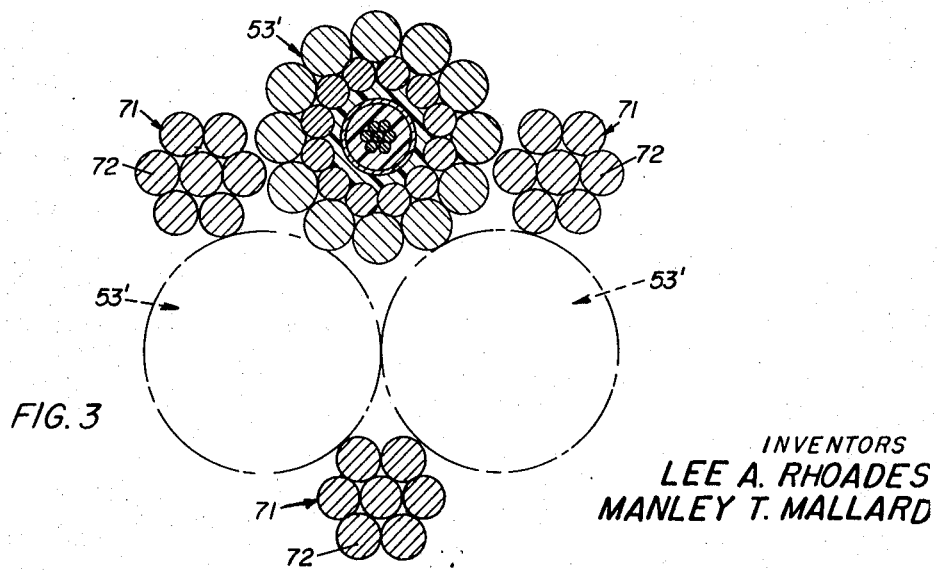
FIG. 3
INVENTORS
LEE A. RHOADES
MANLEY T. MALLARD

MULTICONDUCTOR ARMORED TOWING ROPE

This application is a division of our copending application, Ser. No. 621,337, filed Mar. 7, 1967, for "Fishing Net Assembly Including Towing Cable Having A Conductor Included Therein With Breakout Means For the Conductor And Fish Shocking cable," now Pat. No. 3,482,034.

This invention relates to metal cables, and more particularly to preformed wire rope having high tensile strength while at the same time carrying one or more wires having high electrical conductivity.

One object of the invention is to provide a high strength, flexible, wire cable, wherein an electrical conductor or conductors are included in one or more of the strands.

Another object of the invention is to provide a seven strand high strength wire cable wherein the core includes an electrical conductor.

Other objects and advantages will be apparent to those skilled in the art after reading the following specification in connection with the attached drawings, in which:

FIG. 1 is an isometric view of an underwater fishing trawl net in which several forms of the present invention may be embodied;

FIGS. 2 and 3 are cross sections of two forms of combined electrically conducting and load bearing ropes such as may be used for towing the net shown in FIG. 1, In FIG. 1 there is shown a vessel such as a tug or trawler, indicated generally by numeral 10 to which there is streamed a long towing wire or cable 11 extending out as far as one of the doors 12 of a trawl net indicated generally by numeral 13. The cable 11 may be of the type which includes an electrical conductor in the core as will be later described. A second cable 14 has one end spliced to the cable 11 as indicated at 15 with its other end joined to the other door 16 of the net. Two other cables 17 and 18 are streamed out behind the doors and are fastened to the opposite corners of the lower portion of the opening of the net. The towing arrangement is completed by cables 17a and 18a connected between the doors and upper sides of the opening of the net 13.

The towing cable containing the electrical conductor or conductors is fastened to the door of the net by means of a short bridle with thimble or similar end terminal. The splice is made with sleeve connections as is done in making the towing bridle connection. The conductor or conductors are connected to a pulse generator (not shown) mounted on the door of the net.

The core 19 of the cable 11, which may include one or more separate electrical conductors emerges from the end of the cable through a breakout, indicated generally by numeral 20, which may also include an eye splice for the load bearing elements of the cable, so that the electrical conductor, or conductors, may be connected, as by means of a conventional waterproof plug, to a junction box 21 on the door 12.

Extending between the doors 12 and 16 and in front of and along the bottom of the net are "shocking" cables indicated generally by numeral 22. These shocking cables may be energized through connection with the junction box 21 and other conductors, such as the cable 23, may lead to other electrical devices or instruments associated with the net. The main load bearing strands of the cable 11 are formed into an eye (as will be later explained), which can be secured to the door 12 by means of a clevis pin (not shown).

The towing cable 11 comprises a core 19 around which are laid one or more preformed metal strands 24 as in conventional wire rope making practice. In the present instance the core is surrounded by six strands to form what is called a seven strand rope and each of the outer strands 24 may, if desired, be formed of a plurality of helically wound smaller wires in accordance with conventional rope making practice. Further, while the core 19 is shown as having only two electrically conductive wires 25, there may be only one or there may be more than two. Preferably these wires will be individually insulated and incased in a covering of extruded plastic 26 or other material and surrounded with an armoring of helically wound metal wires 27. Several other forms of core will be described later, the only requirement for the core being that it have an outer diameter equivalent to the diameter of the core which it replaces.

In preparation of the splice, indicated at numeral 30 in FIG. 1, the strands of the bridle cable are laid into the valleys formed by the strands of the conductor cable, ferrules are then slid into place over the "doubled" body and compressed by a suitable tool or machine.

At the net door, a similar splice 31 is made with a short piece of bridle cable equipped with a thimble or similar end terminal for fastening to a clevis on the door. The conductor cable thus is undisturbed and leads to the electrical junction on the door. A breakout of any suitable type of construction is used at these splices to bring the electrically conductive wiring out for connection to the junction box.

In certain situations where it is desirable to provide more than one separate electrical path of relatively high capacity in a towing cable having, in addition, high tensile strength, a form of cable such as is shown in FIG. 2 may be preferable. In this modified form the cable consists of three helically wound strands indicated generally by numeral 53. Each of the strands may include a core having a central arrangement of electrical conductors 54 surrounded by polyethylene or polypropylene insulating coating 55 provided with a braided rayon jacket 56 which, in turn, is coated with nylon plastic or other suitable material 57. This inner core of electrical wires and insulating coating is covered with two layers of high tensile strength wires which serve both as load carrying elements and as a protective armoring for the core portion.

As an illustrative example of a three strand cable, the two layers may comprise 12 wires each of Seale type construction. The wires in both layers are preformed and wound in the same direction and opposite to the direction of lay of the strands around a central axis. The lay of the strands may be right-hand or left-hand.

The form of combined conductive and load bearing cable shown in FIG. 2 provides many advantages in situations where the number of individual conductive wires in a cable would result in an excessive diameter. In many cases if the equivalent number of conductors were placed in the central core of a cable, the resulting rope diameter would be too large to operate satisfactorily on existing trawling equipment. The inner layer of wires 58 provides a smooth inner layer to distribute unit pressures on the jacket of the conductor and the larger outer wires 59 resist crushing and abrasion when the cable is wound on small cable drums or passed through small diameter sheaves.

FIG. 3 discloses a modified form of the electrically conductive cable of FIG. 2 so as to provide a multiconductor high strength cable which provides a greater amount of tractive contact between the cable and a pulley and is better formed to being wound in multiple layers on a winch drum. In this embodiment each of the preformed strands 53' are identical in construction with the strands 53 as shown in FIG. 2. But, in addition to the strands 53', there are also provided three filler strands 71, each of which is made up of a seven strand rope of galvanized steel wires 72.

The addition of the filler strands results in the formation of a rope which is more nearly circular in overall cross section so that there is less unevenness in the disposition of the rope as it is wound up in multiple layers on a drum and the stresses in the rope are more evenly distributed during bending in passing through a sheave. It also forms a smoother outer strand contour, distributes radial crushing pressures to a greater degree, and provides 6 valleys instead of the three to facilitate splicing of a six strand bridle cable by means of a ferrule splice.

Having disclosed several forms in which the invention may be practiced, it will be evident to those skilled in the art that various modifications and improvements may be made which would come within the scope of the annexed claims.

We claim:

1. A multiconductor electric armored towing rope, comprising a three strand helically preformed cable, each said strand comprising an electrically conductive low tensile strength first wire having a first uniform diameter along its entire lengths, a nonconductive covering surrounding the first wire, a plurality of second wires of high-tensile strength metal having a second uniform diameter along their entire lengths surrounding said covering and a plurality of third wires of high-tensile strength metal having a third uniform diameter along their entire lengths, the lay of the second and third wires being the same, and said second and third diameters being such that adjacent wires of both pluralities will be in contact with each other along their entire lengths.

2. The invention as defined in claim 1, wherein additional first conductive wires are included within the nonconductive covering.

3. The invention as defined in claim 1, wherein said first wire is surrounded by a first nonconductive coating, a braided fabric covering, and a second nonconductive coating, respectively.

4. The invention as defined in claim 3, wherein additional first conductive wires are included with the first nonconductive coating.

5. The invention as defined in claim 1, wherein said multiconductor electric armored towing rope also includes three seven strand preformed filler strands, each filler strand being laid respectively between a pair of said first mentioned three preformed strands, the diameter of each said filler strand being less than the diameter of a first strand.

6. The invention as defined in claim 5, wherein said filler strands comprise high-tensile strength wires.

7. The invention as defined in claim 5, wherein said filler strands comprise seven wires of galvanized steel.